US008490572B2

(12) United States Patent
Mitsui et al.

(10) Patent No.: US 8,490,572 B2
(45) Date of Patent: Jul. 23, 2013

(54) ROTARY ATOMIZER AND COATING PATTERN CONTROL METHOD

(76) Inventors: Michio Mitsui, Yokohama (JP); Ryuji Tani, Narashino (JP); Sadao Inose, Yokohama (JP)

( * ) Notice: Subject to any disclaimer, the term of this patent is extended or adjusted under 35 U.S.C. 154(b) by 253 days.

(21) Appl. No.: 12/922,165

(22) PCT Filed: Mar. 11, 2009

(86) PCT No.: PCT/IB2009/000490

§ 371 (c)(1), (2), (4) Date: Sep. 11, 2010

(87) PCT Pub. No.: WO2009/112932

PCT Pub. Date: Sep. 17, 2009

(65) Prior Publication Data

US 2011/0014387 A1 Jan. 20, 2011

(30) Foreign Application Priority Data

Mar. 12, 2008 (JP) .................................. 2008-62304

(51) Int. Cl.

| | |
|---|---|
| ***B05B 1/28*** | (2006.01) |
| ***F23D 11/32*** | (2006.01) |
| ***B05D 1/02*** | (2006.01) |
| ***B05D 5/00*** | (2006.01) |
| ***B05D 7/00*** | (2006.01) |
| ***B05D 1/04*** | (2006.01) |
| ***B28B 19/00*** | (2006.01) |
| ***B29B 15/00*** | (2006.01) |
| ***C23C 18/00*** | (2006.01) |
| ***C23C 20/00*** | (2006.01) |
| ***C23C 28/00*** | (2006.01) |
| ***B05C 5/00*** | (2006.01) |
| *B05C 15/00* | (2006.01) |

(52) U.S. Cl.

USPC ........... 118/300; 239/290; 239/293; 239/703; 239/704; 239/8; 118/302; 427/475; 427/421.1

(58) Field of Classification Search

USPC .................. 118/302, 300; 239/223, 224, 703, 239/704, 104, 290, 291, 292, 300; 427/475, 427/480, 484, 421.1

See application file for complete search history.

(56) References Cited

U.S. PATENT DOCUMENTS

2007/0063068 A1 * 3/2007 Seitz et al. .................... 239/223

FOREIGN PATENT DOCUMENTS

JP 7-24367 A 1/1995

(Continued)

OTHER PUBLICATIONS

ISR and Written Opinion for PCT/IB2009/000490 dated Jul. 20, 2009.

*Primary Examiner* — Dah-Wei Yuan

*Assistant Examiner* — Binu Thomas

(74) *Attorney, Agent, or Firm* — Lowe Hauptman Ham & Berner, LLP

(57) ABSTRACT

A rotary electrostatic atomizer uses shaping air and pattern control air. Shaping airflow is supplied from shaping air holes aligned along outer one of concentric circles that are concentric with the rotation axis of the bell cup and located behind the front end of the bell cup. Pattern control airflow is supplied from pattern control air holes aligned along inner one of the concentric circles. Both the shaping air flow and the pattern control airflow are expelled in circumferentially twisted directions substantially with an equal twist angle opposite from the rotating direction of the bell cup. The shaping airflow passes a circular line near to and radially outwardly apart from the outer perimeter of the bell cup. The pattern control airflow intersects the shaping airflow from radially inside at the position near to and radially outwardly apart from the outer perimeter of the bell cup. Thereby, the pattern control airflow gives the shaping airflow a radially outward force to enhance the centrifugal force of the shaping air and enlarge the coating pattern regulated by the shaping airflow.

7 Claims, 6 Drawing Sheets

FOREIGN PATENT DOCUMENTS

| | | | | |
|---|---|---|---|---|
| JP | 8-84941 | A | | 4/1996 |
| JP | 8-99052 | A | | 4/1996 |
| JP | 08099052 | A | * | 4/1996 |
| JP | 9-94488 | A | | 4/1997 |
| JP | 09094488 | A | * | 4/1997 |
| JP | 2002-224611 | A | | 8/2002 |

* cited by examiner

ROTARY ATOMIZER AND COATING PATTERN CONTROL METHOD

RELATED APPLICATIONS

The present application is National Phase of International Application Number PCT/IB2009/000490 filed Mar. 11, 2009, and claims priority from Japanese Application Number 2008-62304 filed Mar. 12, 2008.

TECHNICAL FIELD

The present invention relates to a rotary electrostatic coating device and coating pattern control method.

BACKGROUND

Electrostatic coating techniques involve electrically depositing atomized paint onto a piece to be coated (workpiece) by means of electrostatic force, and rotary electrostatic coating devices provided with a rotary head are known as devices for achieving this, wherein a typical example of the rotary head is a cup-shaped bell cup. Electrostatic coating devices of this type are employed for powdered paint, insulating liquid paint (e.g. oil-based paint), and conductive liquid paint (e.g. metallic paint or water-based paint), and there are also rotary electrostatic coating devices which are known of the type in which a high voltage is applied to the rotary head, and of the type in which a high voltage is applied to an external electrode which is remote from the rotary head in the outwardly radial direction.

Rotary electrostatic coating devices employ shaping air in order to direct paint onto the piece to be coated, and the coating pattern is dictated by means of this shaping air. As disclosed in the prior art section of Patent Document 1, the shaping air flows out from shaping air holes which are positioned to the rear of the bell cup, and it is then directed to the outer peripheral edge of the bell cup, and this has been the practice in the past. The shaping air which flows out from the shaping air holes strikes the outer peripheral edge of the back face of the bell cup, and therefore the flow speed thereof is reduced. This means that the flow of shaping air which has already passed by the bell cup is drawn radially inward because of the negative pressure in front of the bell cup which is produced by the flow of shaping air, and as a result the diameter of the coating pattern tends to be reduced.

It is better for the minute paint particles in metallic paint to strike the surface of a workpiece at high speed, something which is known in the art. However, as the flow speed of the shaping air increases, so the negative pressure in front of the bell cup increases, as a result of which there are problems in that the diameter of the coating pattern becomes smaller. The response to this problem in Patent Document 1 concerns the orientation of the shaping air which flows out from the shaping air holes, and that document proposes setting the orientation of the shaping air holes such that the torsion direction thereof is oriented about the axis of rotation of the bell cup. The shaping air forms a helical swirling flow due to the shaping air holes whereof the torsion direction has been oriented in this way, and the diameter of the coating pattern can be increased by the centrifugal force of this swirling flow.

Patent Document 2 proposes an improvement on the inventions of Patent Document 1. That is to say, the inventions of Patent Document 1 resolve the problems when the flow speed of the shaping air is increased for metallic coating, but Patent Document 2 focuses on problems such as excess spraying leading to paint loss when the diameter of the coating pattern is constant, for example when a narrow area such as an automobile pillar is being coated, and proposes an idea to improve on this situation.

The inventions proposed in Patent Document 2 are based on setting the orientation of the shaping air, which was proposed in Patent Document 1, in other words on setting the orientation of the shaping air holes in a torsion direction about the axis of rotation of the bell cup, and in said document, control air holes are provided further outward in the radial direction than the shaping air holes, and pattern control air which flows out from these control air holes strikes the shaping air at the outer peripheral edge of the bell cup, then the amount of outflow of pattern control air is changed, whereby the coating pattern width is controlled. In this instance, the control air holes which are positioned radially outward of the shaping air holes have a zero torsion angle about the axis of rotation of the bell cup, and they are inclined toward the axis of rotation of the bell cup. In other words, the shaping air holes have a torsion angle about the axis of rotation of the bell cup, and they are directed at the outer peripheral edge of the back face of the bell cup. In contrast to this, the control air holes have a zero torsion angle about the axis of rotation of the bell cup. The control air is inclined toward the axis of rotation of the bell cup, and therefore it merges with the shaping air at the outer peripheral edge of the bell cup.

When the outflow of pattern control air is stopped, the centrifugal force of the shaping air which swirls helically overcomes the suction force due to the negative pressure in front of the bell cup, whereby a coating pattern of relatively large diameter is formed. On the other hand, when the pattern control air is made to flow out, this pattern control air has a zero torsion angle, and therefore the pattern control air merges with the shaping air, whereby the torsion angle of the shaping air is substantially reduced, as a result of which the swirling force of the shaping air which swirls helically is weakened. Accordingly, the centrifugal force of the shaping air is relatively small, and therefore the effect of the negative pressure in front of the bell cup is weakened, and the diameter of the coating pattern is reduced.

As described above, Patent Document 2 relates to metallic coating, and it proposes reducing the diameter of the coating pattern by reducing the torsion angle of the shaping airflow which swirls helically, using control air which merges with the shaping air.

Patent Document 3 offers another proposal relating to variable control of the diameter of the coating pattern. The proposal of Patent Document 3 is similar to Patent Document 2 in that control air holes are provided radially outward of the shaping air holes, but the inventions of Patent Document 3 differ from those of Patent Document 2 firstly in that the control air is made to swirl helically, and they differ from Patent Document 2 secondly in that the pattern control air is parallel to the flow of shaping air (the control air and the shaping air do not merge).

To be more specific, in the inventions of Patent Document 3, a flow of pattern control air which swirls helically at a torsion angle which is different from that of the shaping air is generated radially to the outer periphery of the flow of shaping air which swirls helically, and then the amount of outflow of this pattern control air is controlled to cause the general torsion angle of the shaping air to change. Changing the diameter of the coating pattern by changing the general torsion angle of the shaping air is as described for Patent Document 2.

Patent Document 1: Japanese Unexamined Patent Application Publication H3-101858

Patent Document 2: Japanese Unexamined Patent Application Publication H7-24367
Patent Document 3: Japanese Unexamined Patent Application Publication H8-84941

SUMMARY

Issues to be Resolved

One aim of the present invention is to provide a rotary electrostatic coating device and a coating pattern control method, in which the diameter of the coating pattern produced by the rotary electrostatic coating device can be varied.

A further aim of the present invention is to provide a rotary electrostatic coating device and a coating pattern control method, in which the diameter of the coating pattern can be varied by different means from those of the inventions disclosed in Patent Documents 2 and 3.

Means of Resolving the Problems

According to a first aspect of the present invention, the abovementioned technical issue is resolved by providing a rotary electrostatic coating device comprising:

a rotary head which causes paint to be discharged radially outward, a plurality of shaping air holes which are arranged at intervals on a first circle which is positioned further back than an outer peripheral part of said rotary head and which has the axis of said rotary head at its center, said shaping air holes directing paint discharged radially outward from the outer peripheral edge of the abovementioned rotary head toward a piece to be coated so as to produce a coating pattern, by means of a shaping airflow which flows out from said shaping air holes, a plurality of control air holes which are arranged at intervals on a second circle which has a smaller diameter than said first circle and is positioned to the rear of the outer peripheral part of said rotary head and concentric with the abovementioned first circle, and first control means for controlling the flow rate of pattern control air which flows out from said control air holes; and the abovementioned shaping air holes and the abovementioned control air holes are oriented in substantially the same torsion angle direction, opposite to the direction of rotation of the abovementioned rotary head;

the axis of the abovementioned shaping airflow passes through a position close to and radially outward from the outer peripheral edge of the abovementioned rotary head; and the axis of the abovementioned control airflow intersects the axis of the abovementioned shaping air at a position which is close to and radially outward from the outer peripheral edge of the abovementioned rotary head.

Furthermore, according to a second aspect of the present invention, the abovementioned technical issue is resolved by providing a method of controlling a coating pattern in which provision is made for a plurality of shaping air holes which are arranged at intervals on a first circle to the rear of a rotary head with the axis of rotation of said rotary head at the center, and which are oriented in a torsion angle direction opposite to the direction of rotation of the abovementioned rotary head, said shaping air holes directing paint discharged radially outward from the abovementioned rotary head toward a piece to be coated so as to produce a coating pattern, by means of shaping air which flows out from said plurality of shaping air holes;

provision is made for control air holes which are arranged at intervals on a second circle having a smaller diameter than the first circle to the rear of the rotary head and concentric with said first circle, and which are oriented in the same torsion angle direction as the abovementioned shaping air holes;

said method comprising:

a paint discharge step in which paint is discharged radially outward from the abovementioned rotary head;

a coating pattern production step, in which the abovementioned shaping air flows out from the abovementioned shaping air holes to produce the abovementioned coating pattern; and a coating pattern control step in which pattern control air which flows out from the abovementioned control air holes is made to intersect the abovementioned shaping airflow at a position close to and radially outward from the outer peripheral edge of the abovementioned rotary head, changing the diameter of the abovementioned coating pattern.

According to the present invention, pattern control airflow with the same torsion angle direction as the shaping airflow is made to merge from the inner peripheral side of the shaping airflow, and the merging position thereof lies at a position close to and radially outward from the outer peripheral edge of the rotary head, and therefore force in the outward radial direction can be imparted to the shaping airflow by the pattern control airflow. Accordingly, the centrifugal force of the shaping airflow can be intensified by the pattern control air without substantially changing the torsion angle of the shaping airflow which swirls helically, and this allows the diameter of the coating pattern which is dictated by the shaping airflow to be enlarged.

The abovementioned aim and further aim of the present invention, and operational effects thereof, will become clear from the detailed description of exemplary embodiments which will be given below.

KEY TO SYMBOLS

Figure 1:
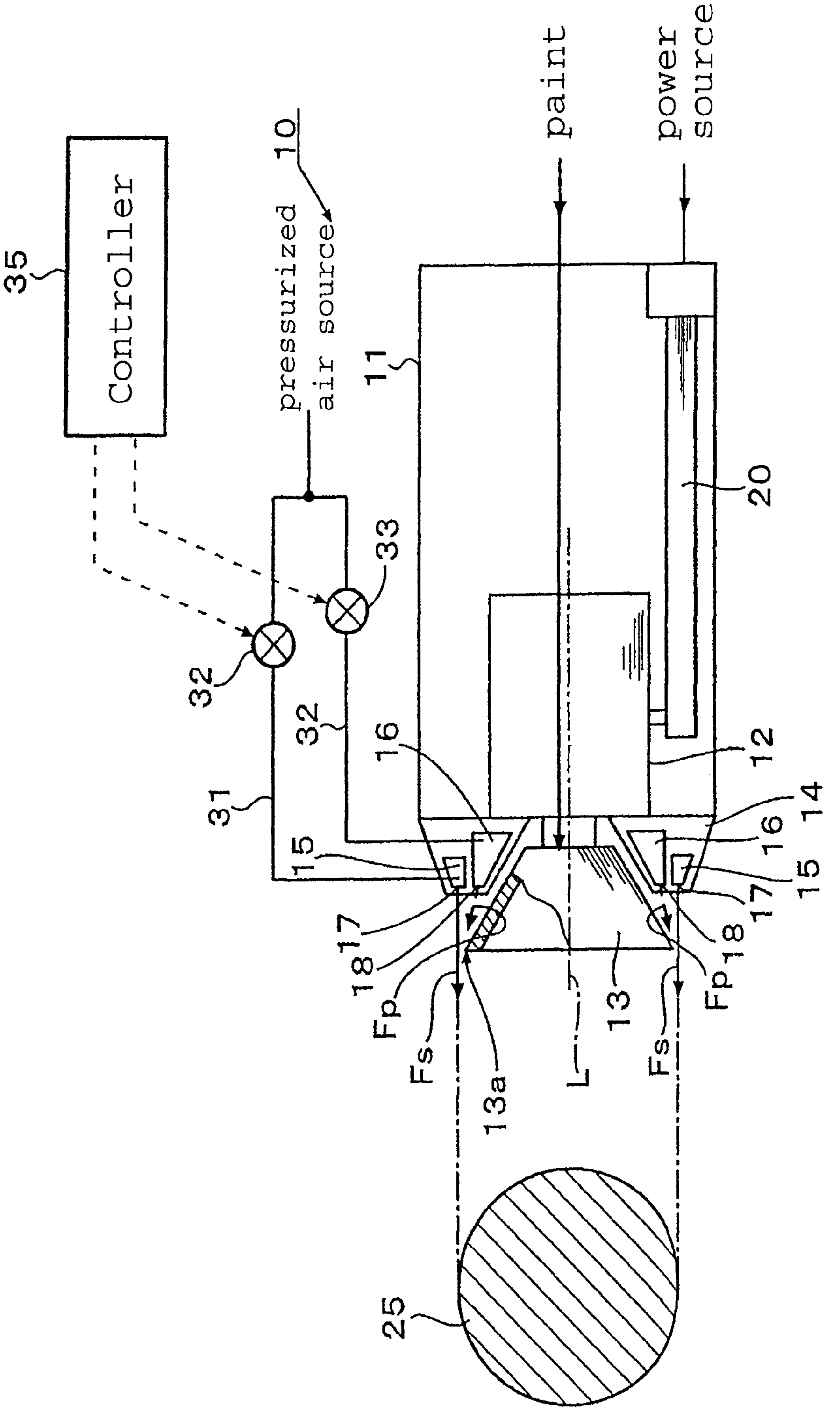
FIG. 1 is a basic structural diagram of the rotary electrostatic coating device of Exemplary Embodiment 1.

L axis of rotation of bell cup
A direction of rotation of bell cup
C1 first circle (shaping air holes)
C2 second circle (control air holes)
Fs shaping airflow
Fp pattern control airflow
θ torsion angle
10 rotary electrostatic coating device
11 device main body
12 air motor
13 bell cup
13*a* outer peripheral edge of bell cup

13*b* inner peripheral surface of bell cup
14 air ring
14*a* outer peripheral part of air ring
14*b* inner peripheral part of air ring
17 shaping air holes
18 control air holes
22 thread-like paint
23 minute paint particles
25 coating pattern
27 merging position

DETAILED DESCRIPTION

Preferred exemplary embodiments of the present invention will be described below based on the appended figures.

Exemplary Embodiment 1

FIGS. 1-5

Looking at FIG. 1, a rotary electrostatic coating device 10 which is depicted comprises a cup-shaped rotary head, i.e. a bell cup 13 which is rotated by an air motor installed in a device main body 11, in the same way as a conventional device. Paint is supplied to a central portion of the bell cup 13, and the paint moves radially outward along the inner surface of the bell cup 13, after which it is discharged from an outer peripheral edge 13*a* of the bell cup 13. In the figures, L denotes the axis of rotation of the bell cup 13, and the arrow A denotes the direction of rotation of the bell cup 13, as described above.

Figure 2:
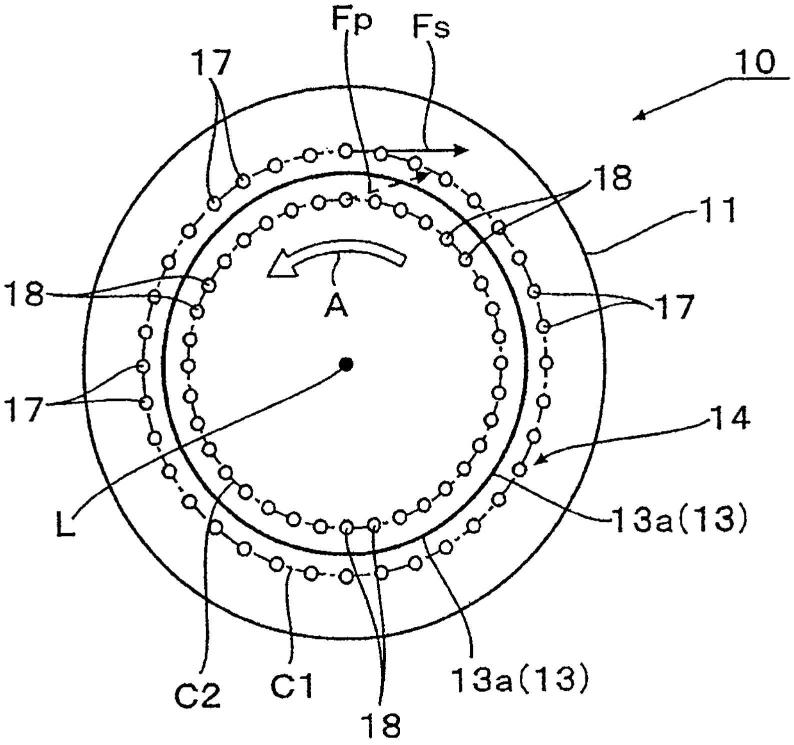
FIG. 2 is a front view of the plane surface occupied by the outer peripheral edge of the bell cup seen from the front of the bell cup.

The device has an air ring 14 lying further to the rear than the outer peripheral part of the bell cup 13. FIG. 2 is a front view of the bell cup 13. Looking at FIG. 2, two annular spaces, namely first and second annular spaces 15, 16 are formed in the air ring 14. Shaping air holes 17 and control air hole 18 are then arranged at the end face of the air ring 14, on first and second concentric circles C1, C2. That is to say, a plurality of shaping air holes 17 are arranged at equal intervals on the first circle C1 of relatively large diameter, and pressurized air is supplied to these shaping air holes 17 through the first annular space 15. Meanwhile, a plurality of control air holes 18 are arranged at equal intervals on the second circle C2 of relatively small diameter, and pressurized air is supplied to these control air holes 18 through the second annular space 16.

There are the same number of shaping air holes 17 as there are control air holes 18, and one shaping air hole 17 and the corresponding control air hole 18 are positioned on a line which radiates from the axis of rotation L of the bell cup 13.

The reference symbol 20 in FIG. 1 denotes a high voltage generator, and a high voltage DC which is generated by the high voltage generator 20 is supplied to the bell cup 13 via a case of an air motor 12. An electric field is then generated between the bell cup 13 to which high voltage has been applied and the piece to be coated (workpiece).

Figure 3:
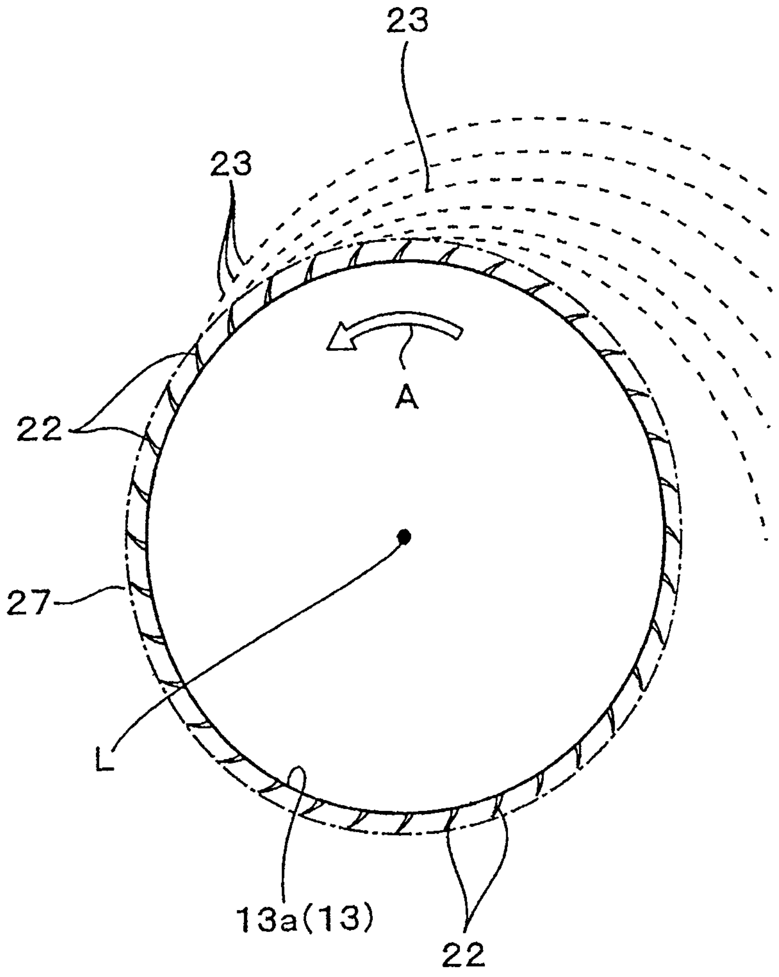
FIG. 3 illustrates the position where the shaping airflow and the pattern control airflow merge.

FIG. 3 is a front view of the bell cup 13. Looking at FIG. 3, rotation of the bell cup 13 causes paint to spread radially outward along the inner peripheral surface of the bell cup 13, the paint then extending thread-like from the outer peripheral edge 13*a* of the bell cup 13, after which the thread-like paint 22 breaks up close to the outer peripheral edge of the bell cup 13, becoming atomized particles 23, and also being ionized.

The paint particles 23 are directed forward, in other words toward the piece to be coated, by a shaping airflow Fs which flows out from the shaping air holes 17. A coating pattern 25 (FIG. 1) is dictated by the shaping airflow. Looking at FIGS. 2 and 4, the shaping air holes 17 are oriented in a torsion angle θ direction opposite to the direction of rotation A of the bell cup 13. By means of this, the shaping airflow Fs which swirls helically can be generated in the same way as in Patent Documents 1 to 3, and the direction of swirling thereof is opposite to the direction of rotation of the bell cup 13. The particles of paint can be atomized by the shaping airflow Fs which swirls helically in the opposite direction to the direction of rotation A of the bell cup 13. In this exemplary embodiment, the shaping airflow Fs which flows out from the shaping air holes 17 is parallel to the axis of rotation L of the bell cup 13, when seen from the side, as is clear from FIG. 4.

Turning now to a description of the control air holes 18 which are positioned on the second circle C2 of smaller diameter than the first circle C1 (FIG. 2) where the plurality of shaping air holes 17 are positioned, these control air holes 18 are also directed in a direction opposite to the direction of rotation A of the bell cup 13, at substantially the same angle as the torsion angle θ of the shaping air holes 17 described above.

Figure 4:
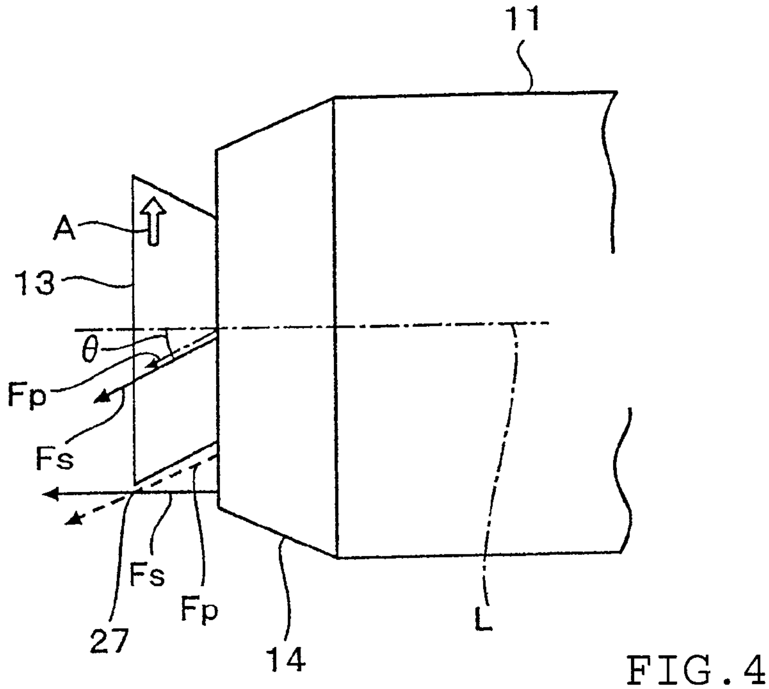
FIG. 4 is a side view illustrating the orientation of the shaping air holes and the control air holes.
Figure 5:
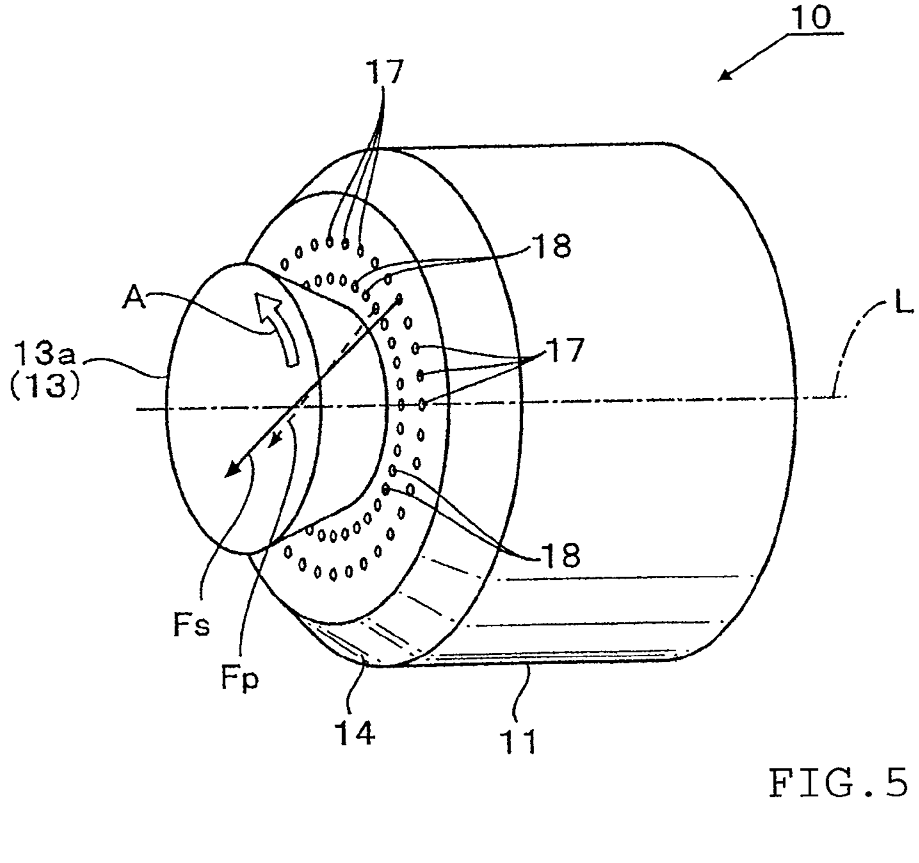
FIG. 5 is an oblique view of the rotary electrostatic coating device seen obliquely from the front.
Figure 6:
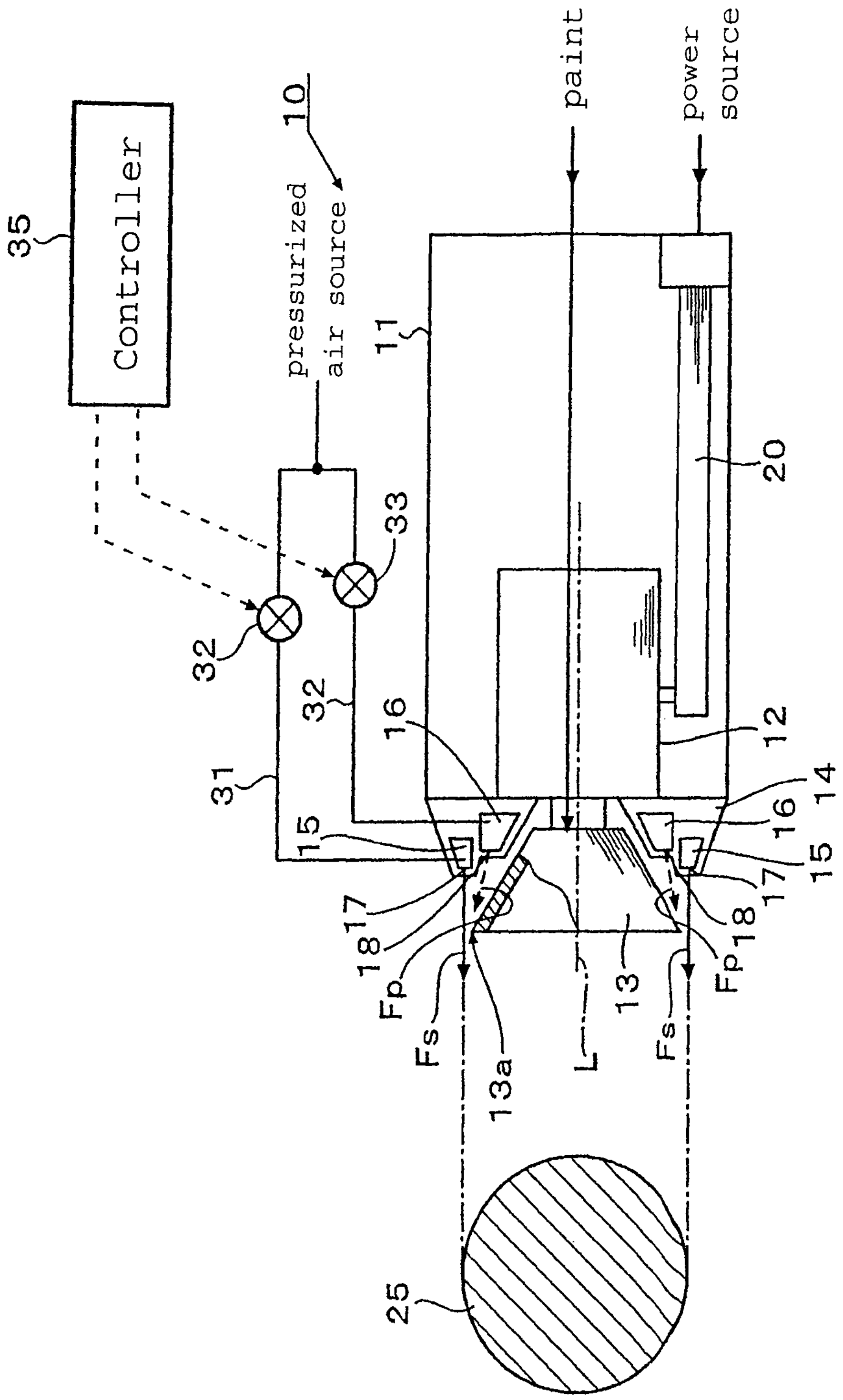
FIG. 6 is a basic structural diagram of the rotary electrostatic coating device of Exemplary Embodiment 2.

Furthermore, these control air holes 18 are directed obliquely outward, when seen from the side, as is clear from FIG. 4, and by means of this the pattern control airflow Fp which flows out from the control air holes 18 merges with the shaping airflow Fs.

The shaping airflow Fs and pattern control airflow Fp will be described in detail. The shaping airflow Fs and pattern control airflow Fp are both swirling flows which swirl helically in the opposite direction to the direction of rotation A of the bell cup 13. The torsion angles of the shaping airflow Fs and pattern control airflow Fp are substantially the same (the torsion angles θ are substantially the same).

Furthermore, setting the shaping airflow Fs which flows out from one shaping air hole 17 so that it merges with the pattern control airflow Fp which flows out from a corresponding control air hole 18 adjacent to this one shaping air hole 17 is as described above, but the point of merger lies close to the outer peripheral edge 13*a* of the bell cup 13 but away from the outer peripheral edge 13*a*, on a plane occupied by the outer peripheral edge 13*a* of the bell cup 13, and to be specific this is preferably 2-3 mm.

FIG. 3 illustrates the merging position of the shaping airflow Fs which flows out from all of the shaping air holes 17 and the pattern control airflow Fp which flows out from the control air holes 18 which are arranged on radiating lines that correspond to each of the shaping air holes 17. First of all, FIG. 3 is a view in which the plane surface occupied by the outer peripheral edge 13*a* of the bell cup 13 is seen from the front of the bell cup 13. In FIG. 3, the merging position of the shaping airflow Fs and the pattern control airflow Fp is shown by the reference symbol 27.

This merging position 27 is a position which is 2-3 mm radially outward from the outer peripheral edge 13*a* of the bell cup 13. Specifically, this merging position 27 is set in relation to the paint which is discharged radially outward from the bell cup 13. To describe this point, the fact that the paint extends in a thread-like form 22 from the outer peripheral edge 13*a* of the bell cup 13, and then that the thread-like paint 22 breaks up and becomes minute paint particles 23 is as described above, but the merging position 27 is set at the tip end of the thread-like paint 22 or at a position immediately following where the minute paint particles 23 separate. The length of the thread-like paint 22 cannot of course be uniformly defined by the rotation speed of the bell cup 13 or the type of paint being used, or by similar factors, but this position can be said to be at the tip end of the thread-like paint 22 or a position immediately following where the minute paint particles 23 separate in most examples of application, provided that it is a position which is 2-3 mm radially outward from the outer peripheral edge 13*a* of the bell cup 13.

Referring to FIG. 1, the pressurized air source for the shaping airflow Fs and the pressurized air source for the pattern control airflow Fp is a shared source, and first and second flow control valves 32, 33 are placed along a first duct 30 which passes through the first annular space 15 (shaping air) of the air ring 14, and a second duct 31 which passes through the second annular space 16 (pattern control air), respectively. The first and second flow control valves 32, 33 are controlled by means of a controller 35.

The diameter of the coating pattern which is related to the area on the piece to be coated (workpiece) is specifically achieved by controlling the second flow control valve 33 (control air flow rate). The first flow control valve 32 (shaping air flow rate) may also be controlled, of course. To describe a typical example in specific terms, the second flow control valve 33 is opened for an area where the surface to be coated is relatively large, and the pattern control airflow Fp flows out from the control air holes 18. The pattern control airflow Fp merges with the shaping airflow Fs, whereby an outward radial force is applied to the shaping airflow Fs by the pattern control airflow Fp without any substantial effect on the torsion angle θ of the shaping airflow Fs, and the centrifugal force of the shaping airflow Fs which swirls helically is intensified by this force. Accordingly, the diameter of the coating pattern 25 can be enlarged by causing the pattern control airflow Fs to flow out from the control air holes 18.

On the other hand, the second flow control valve 33 is closed for an area where the surface to be coated is relatively small, and the outflow of the pattern control airflow Fp from the control air holes 18 is stopped. Accordingly, the coating pattern 25 of the electrostatic coating device 10 is dictated by the shaping airflow Fs which swirls helically. In other words, the coating pattern 25 is smaller than in the case where the pattern control airflow Fp is made to flow out.

Furthermore, a description has been given in the exemplary embodiment described above of a typical example of control in which the pattern control airflow Fp is switched ON/OFF, but it goes without saying that multistage control or linear variable control may be employed for the pattern control airflow Fp.

Exemplary Embodiment 2

FIGS. 6, 7

Figure 7:
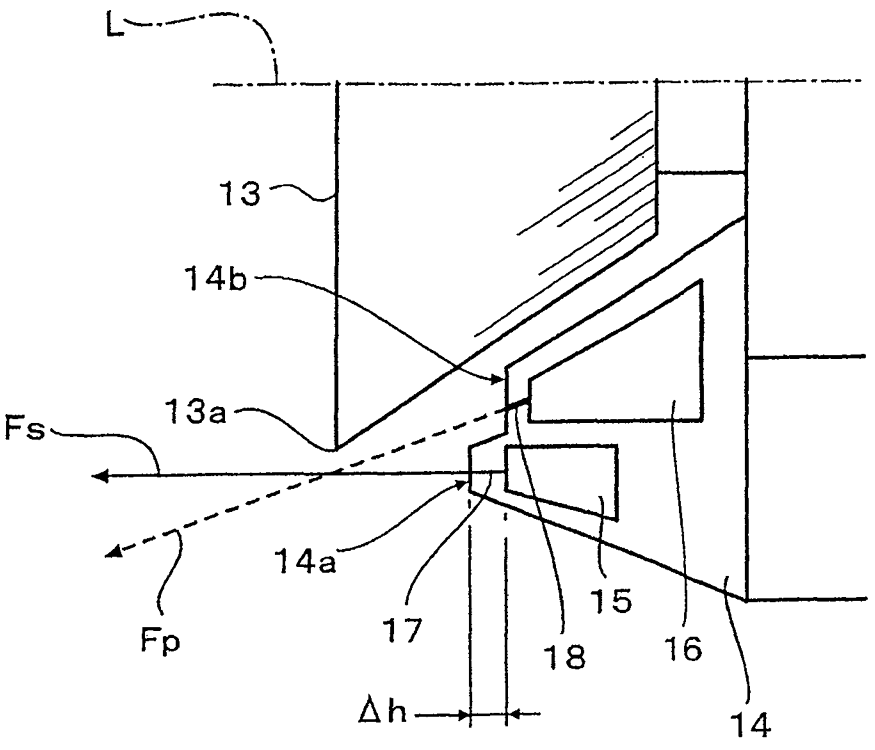
FIG. 7 is an enlarged view of the main parts showing the stepped structure of the air ring included in Exemplary Embodiment 2.

Exemplary Embodiment 2 is a variant example of Exemplary Embodiment 1. In Exemplary Embodiment 1, as regards the air ring 14, the shaping air holes 17 and the control air holes 18 which are positioned radially further inward than said shaping air holes 17 open out in a common plane (FIG. 1), but the end face of the air ring 14 may comprise a stepped face, and, as shown in the enlarged view of FIG. 7, an outer peripheral part 14*a* where the shaping air holes 17 are positioned may project further forward than an inner peripheral part 14*b* where the control air holes 18 are positioned, with the distance between the shaping air holes 17 and the outer peripheral edge 13*a* of the bell cup 13 being shortened. The height (Δh) of the stepped part between the outer peripheral part 14*a* and the inner peripheral part 14*b* of the air ring 14 is 2-3 mm. In other words, in Exemplary Embodiment 2, the end where the shaping air holes 17 open is positioned 2-3 mm forward of the end where the control air holes 18 open.

In this way, the impact speed of the paint particles on the piece to be coated can be increased by bringing the end where the shaping air holes 17 open closer to the outer peripheral edge 13*a* of the bell cup 13, that is to say, by bringing this end closer to the piece to be coated. It was confirmed with trial products in particular that this was effective in improving the coating quality of metallic coating.

Exemplary embodiments have been described above, but, as an example of coating pattern control, control may be effected so that the diameter of the coating pattern 25 can be increased and/or decreased by combining the control of the first and second flow control valves 32, 33. For example, the diameter of the coating pattern 25 can be increased by opening the second flow control valve 33 wide (pattern control airflow Fp: large), while at the same time narrowing the first flow control valve 32 to weaken the shaping airflow Fs. In this way, the diameter of the coating pattern 25 can be changed linearly by combining control of the first and second flow control valves 32, 33, using control relating to increasing and decreasing the diameter of the coating pattern 25.

Furthermore, in the exemplary embodiments, the amount of paint supplied to the bell cup 13 is the same, regardless of the flow control of the pattern control airflow Fp, but the amount of paint which is supplied to the bell cup 13 may be controlled so that the amount of paint corresponds to the diameter of the coating pattern 25 which is produced in correspondence with the flow control of the pattern control airflow Fp. It should be noted that examples of control in which the amount of paint is constant regardless of the flow control of the pattern control airflow Fp are not suitable for metallic coating in which the color is affected by the relationship between the diameter of the coating pattern 25 and the amount of paint. Accordingly, if a control example is used in which the amount of paint is constant regardless of the ON/OFF state of the pattern control airflow Fp, paint other than metallic paint should be used. In other words, in the case of metallic coating, control of the amount of paint and control of the shaping air should be included, rather than limiting control to only the control air.

Furthermore, in the exemplary embodiments, the shaping airflow Fs was parallel to the axis of rotation L of the bell cup 13, when seen from the side, but it may be somewhat inclined, and the shaping airflow Fs may be inclined in a direction approaching the axis of rotation L, or conversely the shaping airflow Fs may be inclined in a direction moving away from the axis of rotation L.

Exemplary embodiments of the rotary electrostatic coating device 10 in which a high voltage is applied to the bell cup 13 have been described above as examples of the present invention, but it goes without saying that the present invention can also be applied in the same way to rotary electrostatic coating devices provided with external electrodes which are used for conductive paint such as water-based paints.

The invention claimed is:

1. A rotary electrostatic coating device, comprising:

a rotary head for discharging paint radially outward, said rotary head having an axis of rotation;

a plurality of shaping air holes configured and arranged at intervals on a first circle which is positioned further back than an outer peripheral part of said rotary head and which has the axis of rotation of said rotary head at its center, a helically swirling shaping airflow flowing out of said shaping air holes, said shaping air holes directing paint discharged radially outward from an outer peripheral edge of the rotary head toward a piece to be coated so as to produce a coating pattern, a plurality of control air holes configured and arranged at intervals on a second circle having a smaller diameter than said first circle and is positioned to a rear of the outer peripheral part of said rotary head and concentric with the first circle, and first control valve configured to control a flow rate of pattern control air which flows out from said control air holes, a second control valve configured to control a flow rate of shaping air which flows out from the shaping air holes; and the shaping air holes and the control air holes are oriented in substantially a same torsion angle direction, opposite to a direction of rotation of the rotary head;

an axis of the shaping airflow passes through a position within proximity to and radially outward from the outer peripheral edge of the rotary head; and an axis of the control airflow intersects the axis of the shaping airflow at a position within proximity to and radially outward from the outer peripheral edge of the rotary head, wherein said shaping airflow and said control airflow merge radially outward from the outer peripheral edge of the rotary head, and wherein said coating pattern is changed linearly by combining control of the said first and second control valves.

2. The rotary electrostatic coating device as claimed in claim 1, wherein there are same number of shaping air holes as there are control air holes.

3. The rotary electrostatic coating device as claimed in claim 1, wherein a position of intersection of the axis of the shaping airflow and the axis of the pattern control air is set to be at a tip end of thread-like paint which is formed at the outer peripheral edge of the abovementioned rotary head or at a position immediately following where minute paint particles separate from the tip end of said thread-like paint.

4. The rotary electrostatic coating device as claimed in claim 1, wherein the end where the shaping air holes open is positioned further forward than an end where the control air holes open.

5. The rotary electrostatic coating device as claimed in claim 3, wherein the shaping airflow which flows out from the shaping air holes is parallel to the axis of rotation of the rotary head, when seen from the side.

6. The rotary electrostatic coating device as claimed in claim 1, wherein the rotary head is a cup-shaped bell cup.

7. A method for controlling the electrostatic coating device comprising a rotary head for discharging paint radially outward, said rotary head having an axis of rotation;

a plurality of shaping air holes configured and arranged at intervals on a first circle which is positioned further back than an outer peripheral part of said rotary head and which has the axis of rotation of said rotary head at its center, a pressurized air source generating a helically swirling shaping airflow out of said shaping air holes, said shaping air holes directing paint discharged radially outward from an outer peripheral edge of the rotary head toward a piece to be coated so as to produce a coating pattern, a plurality of control air holes configured and arranged at intervals on a second circle having a smaller diameter than said first circle and is positioned to a rear of the outer peripheral part of said rotary head and concentric with the first circle, and first control valve configured to control a flow rate of pattern control air which flows out from said control air holes, a second control valve configured to control a flow rate of shaping air which flows out from the shaping air holes; and the shaping air holes and the control air holes are oriented in substantially a same torsion angle direction, opposite to a direction of rotation of the rotary head;

an axis of the shaping airflow passes through a position within proximity and radially outward from the outer peripheral edge of the rotary head;

an axis of the control airflow intersects the axis of the shaping airflow at a position within proximity to and radially outward from the outer peripheral edge of the rotary head, wherein said shaping airflow and said control airflow merge radially outward from the outer peripheral edge of the rotary head, and wherein said coating pattern is changed linearly by combining control of the said first and second control valves, said method comprising:

discharging paint radially outward from the rotary head;

producing a coating pattern, wherein the shaping air flows out from the shaping air holes to produce the coating pattern;

controlling the coating pattern wherein pattern control air which flows out from the control air holes is made to intersect the shaping airflow at a position within proximity to and radially outward from the outer peripheral edge of the rotary head, and changing a diameter of the coating pattern.

* * * * *